United States Patent Office 3,666,542
Patented May 30, 1972

3,666,542
PROCESS FOR THE PRODUCTION OF
MICROPOROUS STRUCTURES
Koji Kigane, Nobuji Ishihara, and Atushi Kametaka, Mihara-shi, Japan, assignors to Teijin Limited, Osaka, Japan
No Drawing. Filed Jan. 28, 1970, Ser. No. 6,600
Claims priority, application Japan, Jan. 31, 1969,
44/7,088
Int. Cl. C08j 1/30
U.S. Cl. 117—135.5                                8 Claims

ABSTRACT OF THE DISCLOSURE

Process for preparing a microporous structure wherein a dispersion of a polyurethane having hydrophilic polyoxyethylene segments in a solvent plus water is coated on a substrate and selectively evaporated.

---

This invention relates to a process for the production of microporous structures, more particularly, it relates to a novel process for the production of microporous structures excellent in mechanical properties and vapor permeability, from a dispersion composed mainly of polyurethane-type elastomers by a dry method.

More specifically, this invention provides a process for the production of microporous structures which comprises (a) Preparing a solution or suspension in an organic solvent having a boiling point lower than 120° C., the solubility (at 25° C.) of water in said organic solvent being less than 50 g, preferably in the range of 1 to 25 g, per 100 g of the solvent, whose resin content (calculated as solids) is 8–30% by weight, said resinous component comprising more than 70% by weight of a polyurethane elastomer consisting of the reaction product of (A) 100 to 10% by weight, preferably 100 to 15% by weight of a polyurethane elastomer composed of (i) a water-insoluble long chain diol selected from the group consisting of polyesters and polyethers having a molecular weight of 500 to 4000 and being substantially hydroxyl-terminated, (ii) an organic diisocyanate, (III) a bifunctional active hydrogen compound having a molecular weight of 62 to 250, and (iv) a polyoxyethylene compound of a molecular weight of 500 to 4000 containing 1 to 2 active hydrogen atoms at the terminal radicals, said polyurethane elastomer containing, as hydrophilic segments, only polyoxyethylene segments in an amount of 2 to 25% by weight; and (B) 0 to 90% by weight, preferably 0 to 85% by weight, of a polyurethane elastomer composed of the said compounds (i), (ii) and (iii), (b) Mixing the resulting organic solvent solution or suspension with water of an amount ranging from 50 to 600% by weight, preferably 150 to 400% by weight, based on said resinous component and exceeding said solubility of water in the organic solvent, to prepare a dispersion;

(c) Coating or impregnating a substrate with the resulting dispersion;

(d) selectively evaporating the organic solvent used from the so treated product at a temperature not higher than 80° C. and at least 10° C. lower than the boiling point of the lowest boiling constituent of the organic solvent used, to thereby gel the resinous component; and (e) Drying the product.

Attempts have been made in recent years to produce synthetic sheets for use as leather substitutes. In making such sheet materials to be utilized in attires for men such as shoes and clothing, it is most important to provide products which will not give any stuffy and musty feelings to wearers during use. This had led to various proposals of making sheet materials having vapor permeability. However, there has not been provided any method capable of meeting economical requirements and giving products having a sufficient durability which is demanded of such products as well as vapor permeability.

The conventional methods of making such vapor permeable microporous structures may be roughly classified into dry methods and wet methods.

As one of the typical examples of the wet methods there may be cited a method comprising adding to a solution of a polymer in a solvent a liquid (non-solvent) that is at least partially miscible with the solvent but is inert to the polymer to form a colloidal dispersion, coating or impregnating a substrate such as non-woven fabrics with said dispersion, dipping the so treated substrate into a coagulation bath consisting of a non-solvent, extracting the solvent to thereby coagulate the polymer in the microporous form, and drying the product. There have been proposed other methods in which in order to control the size of pores formed in the polymer or the pore size distribution, moisture is caused to be absorbed in the substrate after coating or impregnation, or a coagulation bath consisting of a solvent and a non-solvent is used, while the treatment with the non-solvent being omitted.

Any of the wet methods comprises the step of treating a polymer dissolved or suspended in a solvent with a liquid that is miscible with the solvent but is inert to the polymer to thereby remove the solvent. Therefore, the wet methods are defective in that it takes much time to extract and remove the solvent completely, it costs much and requires much large apparatus to separate the extracted solvent from the non-solvent and recover the solvent, and that a comparatively high boiling solvent such as N,N-dimethylformamide, N,N-dimethylacetamide and dimethylsulfoxide is generally used. Further, with reference to qualities of resulting microporous structures, the wet methods are relatively insufficient to obtain a product satisfactory in both vapor permeability and durability at the same time.

On the other hand, there have been also known processes for the production of microporous structures by the dry method. The "dry method" referred to herein is meant to include methods which do not comprise the treatment with an inert liquid, the use of which is essential in the wet method. As the dry method there has been known a method of providing micropores by adding a foaming agent (foam-generating material) to a polymer solution or suspension, and effecting foaming during the coagulation of the polymer or after the coagulation of the polymer while keeping it in the softened state by heating. Another known dry method comprises adding a multiporous filler to a polymer solution or suspension. Microporous structures obtained by these known dry methods are poorer in quality than those obtained by the wet methods. More specifically, since according to these dry methods closed cells are usually formed, it is difficult to obtain a sheet having a sufficient vapor permeability. In case closed cells are opened and communicated with one another by some means or others, the tear strength of the resulting sheet becomes insufficient.

As a result of our researches made with a view to avoiding the defects of the above-mentioned conventional methods, we have devised a novel process by which it is possible to provide in a very economical way a vapor permeable microporous structure having a high velocity of vapor permeability which conventional methods have found it exceedingly hard to provide, and an excellent durability which is incompatible with the high velocity of vapor permeability in the products obtained by the conventional methods.

As will be apparent from the description given hereinafter, the process of this invention can be distinguished from the conventional dry methods in the respect where the process of this invention does not use a foaming agent or a multiporous filler. Further, the process of this invention can be distinguished from the conventional wet methods in the respect where it does not include the step of coagulating a polymer solution or suspension by the treatment with a coagulation bath composed of a non-solvent.

Some of the co-inventors of this invention proposed previously a process for the production of microporous structures by the dry method not using a foaming agent or a multiporous filler. This previous proposal is quite silent to the above polyurethane elastomer (A) to be used in the process of this invention, and in this previous process it is essential to form a dispersion by mixing an organic solvent solution or suspension of the above polyurethane elastomer (B) with an aqueous latex. On the other hand, the process of this invention uses a resinous component which comprises at least 70% by weight of a polyurethane elastomer composed of the above polyurethane elastomer (A) alone or in combination with the above polyurethane elastomer (B), and it does not use an aqueous latex at all. Accordingly, the process of this invention can be distinguished from the above previous proposal in the respect where in the process of this invention it is indispensable to form an organic solvent solution or suspension of a resinous component substantially free of water in advance and to mix the said solution or suspension with a specific amount of water. Thus, according to this invention it is possible to avoid the use of an aqueous latex which is inferior in stability during storage or transportation, and to produce a microporous structure having a much improved combination of vapor permeability and durability with excellent reproduceability in respect of either the operation or the quality of the product. Further, since according to this invention it is possible to increase greatly the amount of water contained in the dispersion for coating or impregnation, the porosity of the product can be controlled within a broad range. Therefore, the limitation on the use of the product is extremely lightened and hence the utility of the product is much increased and broadened. Still further, the limitation imposed on the control of the evaporation rate in the selective evaporation of the organic solvent used is conspicuously moderated, and evaporation rates of a broad range can be adopted, with the consequence that the process of this invention is extremely advantageous from the operational view-point.

A primary object of this invention is to provide a process for the production of microporous structures not only having a highly improved vapor permeability but also being excellent in durability which is usually incompatible with the vapor permeability, which process is novel and can be distinguished clearly from any of conventional methods. Another object of this invention is to provide a process which can produce microporous structures of high quality with great economical advantage by the dry method using a comparatively low boiling solvent which is easily recoverable. Other objects and advantages of this invention will be apparent from the description given hereinafter.

In accordance with this invention the dispersion to be coated on, or impregnated into, the substrate is composed of an organic solvent which is specified by the boiling point and the solubility of water thereinto, a polyurethane elastomer (A) containing a certain prescribed amount of hydrophilic segments (polyoxyethylene segments), and water of an amount exceeding its solubility in said organic solvent. The above specific combination of the organic solvent and polyurethane elastomer (A) makes it possible to keep such great amount of water stably dispersed in the dispersion. The stability of the dispersion is much degraded without this combination. For instance, in case a polyurethane elastomer free of polyoxyethylene segments is used as elastomer (A) while the solvent meeting the above requirements is used, or an organic solvent in which water is soluble at a solubility exceeding 50 g. per 100 g. of the solvent is used while the polyurethane elastomer meeting the above requirements is used, and water is added thereto in the above mentioned specific amount, the resulting dispersion is quite poor in stability and the coating or impregnation cannot be effected.

In accordance with this invention after the dispersion containing a great amount of water has been coated on, or impregnated into a substrate, the resinous component contained in the dispersion is gelled in the microporous form by selectively evaporating the organic solvent from the coating layer or the impregnated substrate. In the wet method, in order to remove the solvent after coating or impregnation, the polymer is coagulated by extracting the solvent with a non-solvent. The extraction with a non-solvent tends to result in occurrence of uneven coagulation or formation of a structure which contains macropores at the surface portion but micropores in the interior. Although various proposals have been made to avoid such undesirable tendency, they usually necessitate additional steps or fail to attain intended effects. In contrast, in accordance with this invention no uneven coagulation is caused to occur, because the resinous component is gelled in the microporous form by evaporating the organic solvent in the dispersion more selectively than water. Thus, according to this invention a microporous structure can be obtained by a simple operation. Further it is also important that water is contained in the dispersion in an amount exceeding its solubility in the organic solvent (which will be sometimes referred to simply as "solvent") contained in the dispersion. By dint of the presence of water in such a great amount, the dispersion applied to the substrate does not absorb the moisture in the air during the step of the selective evaporation and this invention can overcome completely the disadvantage of necessitating the moisture-absorbing phenomenon whose control and reproducibility are very difficult. Further, this invention can overcome the fatal defect of the dry method that the quality of the product is bad.

The evaporation of the solvent is carried out under such conditions as will evaporate the solvent more selectively than water. Since the polyurethane elastomer (A) having hydrophilic segments is used as the resinous component, water contained in the dispersion can be well retained therein during the evaporation step. Therefore, the selective evaporation of the solvent can be achieved more easily than in the case of a dispersion containing as the resinous component a polyurethane elastomer not containing any hydrophilic segments.

Further, since the polyurethane elastomer (A) containing hydrophilic segments has a function of dispersing water, the formation of macropores caused by agglomeration of minute droplets of water can be prevented during the coagulation. Hence, in accordance with this invention it is possible to obtain microporous structures containing very fine and uniform pores.

The process of this invention and components of the dispersion to be used in the process will be now described more detailedly.

As mentioned hereinabove, in the process of this invention the organic solvent, which is one component of the dispersion, is selectively evaporated and then the drying is effected, whereby the resinous component composed mainly of a polyurethane elastomer is gelled in the microporous form. In case an organic solvent of a boiling point too much higher than that of water is used, it is difficult to evaporate the solvent selectively, however controlled or adjusted other conditions may be, with the result that it is impossible to obtain a structure of fine pores. Therefore, the primary condition required of the organic solvent to be used is that its boiling point must not exceed 120° C. (although the best physical constant specifying the volatility of the solvent is its vapor pressure at the operation temperature, no substantial change is not caused at temperatures within a range adopted in conducting the process of this invention, even if the solvent is specified by its boiling point instead of the vapor pressure). The second condition relates to the solubility of water in the organic solvent. Namely, it is necessary to use an organic solvent in which the solubility of water (at 25° C.) is less than 50 g., preferably 1–25 g., per 100 g. of the solvent. In order to gel the resinous component in the microporous form without coagulation treatment with a non-solvent, it is necessary to make a great amount of water contained in advance in the dispersion to be used for coating or impregnation. As is well known, when such great amount of water is added to a polymer solution containing as indispensable component a solvent having a high ability of dissolving water such as N,N-dimethylformamide, the polymer is coagulated and precipitated from the solution. In order for a great amount of water to be contained stably in the dispersion it is required that a major portion of water must be present in the state dispersed in the system, though a part of water may be dissolved in the solvent. For maintaining such state it is necessary that the solubility of water in the organic solvent used must be lower than the above mentioned value.

However, the above secondary condition is not a sufficient condition for making water stably dispersed in the polyurethane elastomer solution or suspension. As described hereinbelow, it is necessary that the polyurethane elastomer contained in the dispersion must be at least partially made hydrophilic by polyoxyethylene segments.

As the solvent meeting the above mentioned conditions there may cited methyl ethyl ketone, methyl-n-propyl ketone, methyl isobutyl ketone, diethyl ketone, methyl formate, ethyl formate, n-propyl formate, methyl acetate, ethyl acetate, isopropyl acetate, isobutyl acetate, secondary-butyl acetate, and 1,2-dichloroethane. It is also permissible to use a mixed solvent prepared by blending a solvent having a higher ability of dissolving water such as acetone, tetrahydrofuran, or dioxane with any of the above cited solvents, or benzene, toluene or n-hexane in a manner such that the solubility (at 25° C.) of water in the resulting mixed solvent will be adjusted to be lower than 50 g. per 100 g. of the solvent. Particularly preferred solvents are methyl ethyl ketone, diethyl ketone, methyl acetate and admixtures of tetrahydrofuran and any of above-mentioned solvents.

The indispensable component of the resinous component used in this invention is a polyurethane elastomer (A) capable of being dissolved or suspended in the above-mentioned solvent, containing 2 to 25% by weight of polyoxyethylene segments and having a molecular weight of 500 to 4000.

The polyurethane elastomer (A) may be prepared by various methods. For instance, it is possible to adopt a method comprising forming a substantially isocyanate-terminated prepolymer from a polyoxyethylene glycol (iv) and a hydrophobic, substantially hydroxyl-terminated, linear polyester and/or polyether (i) (which will be sometimes referred to simply as "water-insoluble long chain diol") with a molar excess of a diisocyanate (ii) and extending the chain of the prepolymer in the above mentioned solvent with the use of a bifunctional active hydrogen compound (iii). It is also possible to adopt a method comprising forming an NCO-terminated prepolymer from a polyoxyethylene glycol (iv) and a diisocyanate (ii), extending the chain of the prepolymer by a molar deficiency of a low molecular weight, bifunctional active hydrogen compound to thereby form an NCO-terminated semipolymer blending the semipolymer with another NCO-terminated semipolymer based on a water-insoluble long chain diol prepared from components (i), (ii) and (iii) in a similar manner, and completing the chain extension. Other known methods of preparing urethane copolymers such as a method using a polyoxyethylene glycol monoalkyl ester as the terminator of the polymerization may be adopted for introducing polyoxyethylene segments. In any case it is necessary that the polyurethane elastomer (A) must contain 2 to 25% by weight of polyoxyethylene segments bonded to hydrophobic polyurethane segment. The content of the polyoxyethylene segment in the polyurethane elastomer (A) is determined by its function of dispersing water stably in a solution or suspension consisting of the above explained solvent and polymer, namely its function as emulsifier of forming a dispersion of a water-in-oil type. In case the polyoxyethylene segment content in the polyurethane elastomer (A) is below 2% by weight, the dispersion stability of water is insufficient. In case the polyoxyethylene segment content exceeds 25% by weight, the dispersion of a water-in-oil type cannot be attained, or the once formed microporous structure tends to be caused to disappear by an action of a solvent contained in water during the selective evaporation or drying step which will be detailed hereinbelow. Accordingly, the use of a polyurethane elastomer containing more than 25% by weight of polyoxyethylene segments is not preferred.

A dispersion obtained by adding water to a solution or suspension comprising the polyurethane elastomer (A) and the above mentioned organic solvent is very stable and suitable for application by coating or impregnation. It is not always necessary that the resinous component to be used in this invention consists solely of the polyurethane elastomer (A). As described above, the polyurethane elastomer (A) acts as an emulsifier in the dispersion system of a water-in-oil type. Therefore, it is permissible that other hydrophobic polymer is coexistent with the polyurethane elastomer (A), so far as the content of the elastomer (A) exceeds a certain lower limit. In case the polyurethane elastomer (B) based on a water-insoluble long chain diol, which will be detailed hereinbelow, is made co-existent with the polyurethane elastomer (A), it is necessary to use the polyurethane elastomer (A) in an amount of at least 10% by weight, preferably at least 15% by weight, based on the whole resinous component. This lower limit is determined based on the stability of the dispersion obtained by adding to a solution or suspension of the resinous component in the organic solvent water in an amount of 50 to 600% by weight based on the resinous component.

The polyurethane elastomer (A) is usually prepared by reacting an organic diisocyanate, a water-insoluble long chain diol, a polyoxyethylene compound having 1 to 2 active hydrogen atoms at the terminal radicals and a low molecular weight, bifunctional active hydrogen compound (chain-extender) optionally in the presence of a reaction promoter. It is generally preferable to form an organic isocyanate compound by the reaction of a long chain diol with a molar excess of a diisocyanate and extend the chain of the organic diisocyanate compound in the above mentioned solvent.

Examples of organic diisocyanates that can be used in this invention are 4,4'-diphenylmethane diisocyanate, 1,3-xylene diisocyanate, 1,4-xylene diisocyanate, 2,4-tolylene diisocyanate, 2,6-tolylene diisocyanate, 1,5-naphthalene diisocyanate and p-phenylene diisocyanate.

As the water-insoluble long chain diol there may be used, for example, polyethylene adipate, polyethylene-propylene adipate (ethylene/propylene molar ratio= 100/0 to 80/20), polyethylene-butylene adipate, polydiethylene adipate, polybutylene adipate, polyethylene succinate, polybutylene succinate, polyethylene sebacate, polybutylene sebacate, polytetramethylene ether glycol, polyhexamethylene ether glycol, poly-ε-caprolactone diol and poly-ε-caprolactone-polyethylene adipate blocked diol, all having a molecular weight of 500 to 4000 and being substantially hydroxyl-terminated.

Polyoxyethylene segments are introduced by employing as a reactant a polyoxyethylene compound of a molecular weight of 500 to 4000 containing 1 to 2 active hydrogen atoms at the terminal radicals. The "polyoxyethylene compound containing 1 to 2 active hydrogen atoms at the terminal radicals referred to in this invention is meant to include water-soluble compounds which contain 1 to 2 terminal radicals selected from —OH, —NH$_2$, >NH and —SH radicals, and all or a greater portion of whose molecule chain is composed of polyoxyethylene segments. Examples of such polyoxyethylene compound are polyoxyethylene glycol; C$_1$–C$_8$ monoalkyl esters, monoaryl esters, monoalkyl ethers and monoaryl ethers of polyoxyethylene glycol; and α,ω-aminopolyoxyethylene, α,ω-iminopolyoxyethylene and α-amino-ω-oxy-polyoxyethylene. There may be also used water-soluble polyether glycol copolymers of a molecular weight of 500 to 4000 containing oxyethylene groups and oxyalkylene groups of 3 to 8 carbon atoms. Further, as the polyoxyethylene compound there may be used various water-soluble polyester diols modified with polyoxyethylene segments which are obtained by using polyoxyethylene glycol as one component in the polycondensation reaction for forming the above-mentioned polyester diol.

In case the molecular weight of the polyoxyethylene glycol or its derivative is less than 500, the stability of the dispersion obtained by adding the above mentioned amount of water to a solution or suspension of the resinous component in the organic solvent is not good. In case the molecular weight of the polyoxyethylene compound or its derivative exceeds 4,000, there is a tendency that the once formed microporous structure is caused to disappear in the selective evaporation of the solvent or the drying step.

In view of the above-mentioned characteristics of the organic solvent to be used in this invention it is preferable to employ aliphatic glycols of 2 to 10 carbon atoms as the above chain-extender (iii) of the bifunctional active hydrogen compound having a molecular weight of 62 to 250. Examples of such aliphatic glycols are ethylene glycol, propylene glycol, 1,3-propane diol, diethylene glycol, 1,4-butane diol, 1,6-hexane diol, 1,8-octane diol and 1,10-decane diol. It is also possible to use such aliphatic glycols in admixture with a glycol having an aromatic ring such as α,α'-xylene glycol and bishydroxyethyl benzene. In this invention it is also possible to use a combination of such glycol with a bifunctional amino compound as the bifunctional active hydrogen compound (iii). In this case the chain-extension is effected to some extent by the above glycol and then the remainder of the chain-extension is accomplished by the bifunctional amino compound. Examples of such bifunctional amino compound are ethylene diamine, propylene diamine, trimethylene diamine, tetramethylene diamine, hexamethylene diamine, decamethylene diamine, m-xylylene diamine, p-xylylene diamine, benzidine, 4,4'-diaminodiphenyl methane, m-phenylene diamine, hydrazine, methylhydrazine, aminoacetic hydrazide and ω-aminopropionic hydrazide.

The molar ratio of the bifunctional active hydrogen compound (iii) to the above compound (i) or compounds (i) and (iv) is preferably in the range of from 1:1 to 1:4.

The reaction between the isocyanate group and the bifunctional active hydrogen compound may be carried out in the presence of a known reaction promoter according to need. As the reaction promoter there may be exemplified N-methylmorpholine, triethyl amine, triethylene diamine, N,N,N',N'-tetramethyl-1,3-butane diamine, inorganic tin compounds such as stannic chloride and stannous chloride, and organic tin compounds such as tetra-n-butyltin, tri-n-butyltin acetate, di-n-butyltin diacetate, dimethyltin dichloride, di-n-butyltin dichloride and di-n-butyltin dilaurate.

The polyurethane elastomer (B) to be used in this invention in combination with the polyurethane elastomer (A) containing polyoxyethylene segments is composed of the above-mentioned water-insoluble long chain diol (i), organic diisocyanate (ii) and bifunctional active hydrogen compound (iii). As is apparent from the explanation given hereinabove, this invention includes an embodiment where a polyoxyethylene compound (iv) having 1 to 2 active atoms at the terminal radicals and a molecular weight of 500 to 4,000 is used in an amount of less than 2% by weight in the preparation of the polyurethane elastomer (B).

As the polyurethane elastomer (B) consists essentially of hydrophobic structural units, it is impossible to obtain a stable dispersion when water is added to a solution or suspension of the polyurethane elastomer (B) alone in the organic solvent without the polyurethane elastomer (A). However, in case the polyurethane elastomer (A) is made present in an amount exceeding 10% by weight based on the whole elastomer, the hydrophobic residue of the resinous component (A) is compatible with the polyurethane elastomer (B) and at the same time the polyoxyethylene segments of the polyurethane elastomer (A) maintain the stable dispersing state of water, with the result that it is possible to form a very stable dispersion suitable for coating or impregnation. The content of the resinous component (calculated as solids) in the dispersion is generally in the range of from 8 to 30% by weight.

The resinous component of this invention is composed mainly of the polyurethane elastomer (A) alone or in combination with the polyurethane elastomer (B) based on the water-insoluble long chain diol. In order to improve abrasion resistance, touch, appearance and the like of the end product more highly, it is possible to blend other polymer in an amount less than 30% by weight of the whole resinous component. As such additional polymer there may be used polyvinyl chloride, polyvinylidene chloride, polyacrylate copolymers, polymethacrylate copolymers, polystyrene, polyethylene-terephthalate-isophthalate copolymers, cellulose acetate, ethyl cellulose, butyl cellulose and the like.

In accordance with this invention a dispersion is formed by adding water to a solution or suspension of the abovementioned resinous component in the organic solvent. By the "suspension" of the resinous component referred to herein is meant a system of the resinous component in the organic solvent which takes an opaque appearance because the resinous component is not completely dissolved in the organic solvent but is partially contained therein in the form of insoluble particles. By the "dispersion" is meant a system where water added is present in the state at least partially dispersed in the solution or suspension of the resinous component in the organic solvent. Water added to the solution or suspension can be very stably maintained in the resulting dispersion by the combined action of the polyurethane elastomer (A) containing hydrophilic and hydrophobic groups and the solvent capable of dissolving water at a specific amount.

The amount of water to be added is a great factor determining the appearance, pore size and pore size distribution of the resulting microporous structure, and hence, it gives great influences to the properties of the microporous structure such as tensile strength, tear strength, velocity of vapor permeability and durability. The optimum amount of water to be added is determined depending on the polyoxyethylene segment content of the polyurethane elastomer (A), the solids content and temperature of the solution or suspension of the resinous component, and the temperature and humidity during the step of forming the microporous structure. But, in this invention it is critical that the amount added to water is at least 50% based on the while resinous component and exceeds the solubility of water in the organic solvent used. In this invention a microporous structure is formed substantially only by conducting the selective evaporation of the organic solvent after coating or impregnation of a substrate with the above dispersion. Accordingly, when the amount of water to be added is below the abovementioned lower limit, it is impossible to obtain a microporous structure having communicated pores, however controlled other conditions may be. An allowable maximum amount of water to be added is 600% by weight based on the whole resinous component. At the amount exceeding this upper limit, it is impossible to form a stable coating or impregnation dispersion having a practical solid content.

The word "stable" has been frequently used herein. By the term "stable dispersion" is meant a dispersion that can give a microporous structure of the substantially same quality in case the coating or impregnation is conducted one hour after the preparation of the dispersion, as in the case where the coating or impregnation is effected just after the preparation of the dispersion. Accordingly, the "stable" dispersion has such a stability that the dispersion state is hardly caused to change and no phase separation is caused to occur, even when it is stored in a sealed vessel maintained at 30° C. for more than one hour. It is usual that the dispersion obtained in this invention can retain the stable state after it has been allowed to stand under the above condition for 5 days or more.

As the method for the preparation of the dispersion, there may be adopted, for instance, (1) a method comprising adding water batchwise to a solution or suspension of the resinous component in the organic solvent and (2) a method comprising blending continuously water into a solution or suspension of the resinous component. This invention is advantageous in that a partial coagulation or precipitation of the resinous component is hardly caused to occur, whatever method may be adopted for addition of water, because the organic solvent, the solubility of water in which is within a specific range, is used.

Known additives such as dyestuffs, pigments, crosslinking agents, stabilizers and fillers may be added to the dispersion, as far as the addition does not destroy the dispersion system. The dispersion contains usually 5 to 25% by weight, preferably 8 to 20% by weight, of solids.

The process of preparing a microporous structure from the dispersion comprises (1) a coating or impregnation step, namely, a step of applying the dispersion to a desired substrate, (2) a selective evaporation step, namely, a step of selectively evaporating the solvent from the dispersion, and (3) a drying step, namely, a step of evaporating the solvent and water remaining in the product by drying.

Various substrates may be used as the substrate depending on the intended use of the end product. Many kinds of woven or knitted fabrics, non-woven fabrics, and similar materials can be used as substrates. Further, so-called impregnated substrates prepared by impregnating resins into the above-mentioned substrate materials may be preferably used. Further, if an appropriate coating support is used as a substrate and coated, and then the support is stripped off after evaporation and drying, a microporous film useful as a surface of a synthetic leather can be obtained. As the support, plastic films, silicon paper, glass sheets, metal sheets or metal foils can be used.

The application of the dispersion to the substrate can be effected by dipping, knife coating, roll coating, casting, spraying or other suitable known means. The "coating or impregnation" referred to herein is meant to include, in addition to both of the unit coating and impregnation operations, the operation in which the coating is effected substantially immediately after the impregnation of the substrate, for instance within 15 seconds.

In the selective evaporation step, it is necessary to selectively evaporate the solvent while preventing the evaporation of water as much as possible. (By the term "selective evaporation" is meant an evaporation conducted in a manner such that the ratio of water to the organic solvent contained in the applied dispersion increases with the lapse of the time of the evaporation.) If much water is evaporated together with the evaporation of the organic solvent, the resinous component is not gelled in the microporous state, and a microporous structure having a high vapor permeability cannot be obtained. The temperature in the selective evaporation step must not be over 80° C. and must be lower preferably at least 10° C. lower than the boiling point of the constituent of the organic solvent having the lowest boiling point (the boiling point of the solvent itself in case the organic solvent used consists of one kind of a solvent alone). A temperature above 80° C. is too near the boiling point of water and it becomes difficult to prevent the evaporation of water, with the result that it is impossible to obtain a microporous structure having excellent quality. At a temperature less than 10° C. below the temperature at which the constituent of the organic solvent having the lowest boiling point boils, the solvent is evaporated too rapidly, and macropores visible to the naked eye are prone to appear in the dispersion layer applied on the substrate. In view of other factors giving influences to the evaporation velocity of the organic solvent such as humidity and drying air speed, it is preferable to conduct the selective evaporation of the solvent at a rate of less than 100 g./m.$^2$/min. In accordance with a preferable embodiment, the selective evaporation of the solvent is performed in such a manner that the evaporation is effected at a rate of less than 20 g./m.$^2$/min. until at least 10% by weight of the solvent is evaporated and then the evaporation is continued at a higher rate but less than 100 g./m.$^2$/min.

The time of the selective evaporation must be at least long enough for the whole dispersion applied to the substrate to reach the gelation point. The gelation point means the point where at least 70% by weight of the solvent originally contained in the dispersion has been evaporated and hence, the resinous component of the dispersion is coagulated. More specifically, the gelation point means the point where the resinous component in the dispersion applied to a substrate of a sheet or plate form having a smooth surface is coagulated to such an extent that a coating thereof can be stripped from the substrate in the form of a film.

When the selective evaporation of the organic solvent is completed, the resulting structure is coagulated to such a degree that the intended microporous structure can be obtained only by drying the same without treatment with a coagulation bath, though a small amount of the organic solvent still remains therein. In the drying step the remaining solvent is removed together with water. The drying is usually carried out for 5 to 30 minutes at 60 to 120° C. The dried product can be directly used for various purposes, but by heat treatment, for instance at 130 to 160° C. for 5 to 20 minutes, its properties can be improved, in respect for instance, of abrasion resistance and flexural fatigue resistance without damaging the high velocity of vapor permeability of the microporous structure.

According to this invention, natural and/or synthetic staple fibers may be added to the dispersion. Examples of preferable staple fibers are those of nylon, rayon, acetate, acrylic, polyvinyl chloride and polyester, all having a fineness of less than 3 denier and a fiber length of 1 to 10 mm. The incorporation of such staple fibers in the dispersion may alter the feel and appearance of the porous material according to the type, shape and amount of the added staple fibers. Thus, it is possible to obtain a microporous structure having more excellent vapor permeability and durability and also a leather-like feel and appearance suitable for various uses.

By the process of this invention, it is possible to produce rapidly and economically a microporous structure capable of use in various forms. For instance, a microporous structure obtained by using a knitted, woven or non-woven fabric or a similar material as a substrate can be used as such, or after association with other sheet materials. If desired, the so obtained structure is used as a substrate to which is applied a microporous film which has been prepared separately. These microporous structures may be widely utilized in clothing, bags, and shoe-uppers as leather substitutes.

As is apparent from the description given hereinabove, the most characteristic feature of this invention resides in usng a specific dispersion obtained by adding water into a solution or dispersion comprising an organic solvent capable of dissolving water in a specific amount and a resinous component containing the above-mentioned specific polyurethane elastomer (A) having polyoxyethylene segments, in an amount exceeding a certain predetermined level. Various advantages of this invention are due to characteristics of the said specific dispersion. For instance, owing to the fact that water is dispersed stably in the dispersion because of the polyurethane elastomer (A) having polyoxyethylene segments, the amount of water to be added can be varied within a broad range and hence, properties of the resulting microporous structure can be also varied depending on the intended use. Further, the reason why a microporous structure of high quality can be obtained by the evaporation of the organic solvent is that the solvent used has a relatively low boiling point and that the initial dispersion system is not likely to be destroyed with ease by the evaporation since water can be kept in the dispersed state by dint of the polyoxyethylene segments of the polyurethane elastomer (A). Accordingly, this invention does not necessitate special coagulation and recovery equipments, and according to this invention it is possible to recover the solvent at low cost in accordance with a customary recovery technique by using an ordinary drier. Still further, as the resinous component of the dispersion comprises the polyurethane elastomer (A) having polyoxyethylene segments, the resinous component has an excellent vapor permeability by itself, which, in co-operation with communicating micropores, can give the resulting microporous structure a combination of a high vapor permeability and a high tenacity which the prior art fails to provide.

This invention will be now described more detailedly by referring to examples. All parts and percentages are by weight unless otherwise indicated.

Values of properties of the products obtained in examples are those measured in accordance with the following methods:

(1) APPARENT DENSITY

The value was obtained by dividing the weight (gr.) of the sheet having an area of 10 x 10 cm.$^2$ by the volume (cm.$^3$) calculated from the thickness measured according to JIS–B–7509.

(2) STRENGTH AT BREAKAGE AND ELONGATION AT BREAKAGE

The values were determined in accordance with JIS–K–6301.

(3) TEAR STRENGTH

The value was determined in accordance within JIS–K–6732.

(4) VELOCITY OF VAPOR PERMEABILITY

The value was determined in accordance with JIS–K–6549.

(5) DURABILITY

The microporous sheet was subjected 10000 times to 100% stretching, and the strength at breakage (kg./mm.$^2$) and the elongation at breakage (percent) of the so treated sheet were measured according to JIS–K–6301. Then, the value of durability was caluculated by the following equation:

Durability=½[(strength at breakage)×(elongation at breakage)]

(6) EFFECTIVE PORE COEFFICIENT

The value is to show the degree of the combination of vapor permeability and durability and is expressed by the product of the velocity of vapor permeability and the durability determined by the above methods.

Example 1

Preparation of a suspension of a polyurethane elastomer containing polyoxyethylene segments: A reaction vessel was charged with 750 parts of 4,4'-diphenylmethane diisocyanate maintained at 50° C., 1300 parts of polyethylene adipate of a molecular weight of 1625 maintained at 60° C., and 300 parts of polyoxyethylene glycol of a molecular weight of 1,500 maintained at 60° C. Reaction was effected in a nitrogen gas stream at 100° C. for 2 hours while stirring to give a viscous prepolymer of a free NCO content of 7.10%. All of the resulting prepolymer was added to a mixture composed of 170 parts of 1,4-butane diol, 3780 parts of methyl ethyl ketone and 3.0 parts of triethylene diamine, and the resulting mixture was reacted at 70° C. for 10 hours. The viscosity at 70° C. of the reaction product was 870 poise at completion of the reaction. The product was diluted with methyl ethyl ketone to form a slurry-like suspension of a solid content of 20%.

Preparation of a dispersion: The above suspension was further diluted with methyl ethyl ketone to a solid content of 17.5%. To 1000 parts of the resulting liquor maintained at 30° C. was added 500 parts of water over a period of time of 5 minutes while agitating the system by means of a high speed stirring mixture. After completion of addition of water, the agitation was continued for further 5 minutes. Thus, there was obtained a white, creamy dispersion of a viscosity of 4200 cps. at 30° C. Water was finely dispersed in the resulting system and the dispersion was quite stable.

Preparation of a microporous structure: Bubbles incorporated during the agitation were removed from the above dispersion under reduced pressure, and then the dispersion was applied to a bi-axially stretched polyethylene terephthalate film in a thickness in a wet condition of 1.8 mm. The selective evaporation of the methyl ethyl ketone was effected at 25° C. for 40 minutes, followed by drying at 100° C. for 20 minutes. The sheet formed on the polyethylene terephtalate film was microporous, and had properties shown in Table 1.

For the sake of comparison, the results of the following comparative examples are given in the same table.

Comparative Example 1

The polyurethane suspension in methyl ethyl ketone of a solid content of 17.5% obtained in Example 1 was applied directly, without addition of water, to a bi-axially stretched polyethylene terephthalate film in a thickness in a wet condition of 1.3 mm., and the evaporation of the methyl ethyl ketone was effected at 25° C. for 40 minutes, followed by drying at 100° C. for 20 minutes. The sheet formed on the polyethylene terephthalate film was semi-transparent and had hardly any vapor permeability.

Comparative Example 2

In the same manner as in Example 1 a polyurethane solution of a solid content of 17.5% was prepared by employing, instead of methyl ethyl ketone, N,N-dimethyl formamide which is completely miscible with water. When 500 parts of water was added to 1000 parts of this solution in the same manner as in Example 1, the phase separation was caused to occur and it was impossible to apply the resulting system to the coating operation.

Comparative Example 3

In the same manner as in Example 1 the polymerization was effected by using as reactants 750 parts of 4,4'-diphenylmethane diisocyanate, 1625 parts of polyethylene adipate of a molecular weight of 1625 and 170 parts of 1,4-butane diol, 3.0 parts of triethylene diamine as polymerization promoter, and methyl ethyl ketone as solvent. Thus, there was obtained a suspension of a solid content of 17.5%. The polymer of this comparative example was different from that of Example 1 in the respect where it had no polyoxyethylene segments.

To 1000 parts of the suspension was added 500 parts of water in the same manner as in Example 1, and they were mixed together while stirring. Water was present in the resulting system in the form of considerably large particles, and when the system was allowed to stand still, the separation into two layers was caused to occur within less than one hour. Immediately after the completion of the mixing and stirring, the dispersion was applied to a polyethylene terephthalate film under the same conditions as in Example 1. The resulting sheet had a vapor permeability, but was poor in the strength because of macropores contained therein.

Comparative Example 4

The dispersion prepared in Example 1 was applied to a polyethylene terephthalate film in a thickness in a wet condition of 1.8 mm., and the dispersion-applied film was dried at 72° C. for 30 minutes and at 100° C. for 15 minutes. The sheet formed on the polyethylene terephthalate film was insufficient in the surface smoothness and poor in the vapor permeability.

of a solid content of 17.5%. To 800 parts of this suspension was added 200 parts of the polyoxyethylene segment-containing polyurethane suspension of a solid content of 17.5% obtained in Example 1. Then, 420 parts of water was added to the mixture under stirring in the same manner as in Example 1 to form a dispersion having a viscosity at 35° C. of 3100 cps. The resulting dispersion was very stable and no phase separation was caused to occur even after it was allowed to stand still overnight at 35° C. Bubbles were removed from this stable dispersion, and then the dispersion was coated by means of a doctor knife on a biaxially stretched polyethylene terephthalate film in a thickness in a wet condition of 1.2 mm. The selective evaporation of the methyl ethyl ketone was effected at 60° C. for 15 minutes to gel the coating layer. Thereafter, the gelled coating layer was dried at 100° C. for 15 minutes and stripped off from the polyethylene terephthalate film to give a microporous sheet having a touch resembling that of a sheep leather and an excellent combination of high mechanical strength and vapor permeability such as shown below.

Apparent density (g./cm.$^3$) ......... 0.71
Strength at breakage (kg./mm.$^2$) ......... 1.28
Elongation at breakage (percent ......... 470
Tear strength (kg./mm.) ......... 2.96
Velocity of vapor permeability (mg./cm.$^2$/hr.) ......... 7.4
Durability ......... 265
Effective pore coefficient ......... 1961

TABLE 1

| Example No. | Properties | | | | | | |
|---|---|---|---|---|---|---|---|
| | Apparent density (g./cm.$^3$) | Strength at breakage (kg./mm.$^2$) | Elongation at breakage (percent) | Tear strength (kg./mm.) | Velocity of vapor permeability (mg./cm$^2$/hr.) | Durability | Effective pore coefficient |
| Example 1 | 0.69 | 1.20 | 455 | 2.72 | 7.5 | 235 | 1,763 |
| Comparative Example 1 | 1.20 | 4.86 | 595 | 4.35 | 0.2 | 1,238 | 248 |
| Comparative Example 2 | Formation of a sheet was impossible | | | | | | |
| Comparative Example 3 | 0.72 | 0.30 | 210 | 1.12 | 3.5 | (¹) | 0 |
| Comparative Example 4 | 0.85 | 1.84 | 510 | 3.04 | 1.8 | 250 | 450 |

¹ Broken during the test.

It is clear from the results given in Table 1 that even if the same resinous component and porous structure-forming means are used, unless the conditions for the composition of the dispersion are satisfied, it is impossible to attain the properties such as those of the product obtained according to the process of this invention. Also, as can be understood from the results of Comparative Example 3, the polyoxyethylene segments contained in the polyurethane elastomer contributes highly to the stable dispersing state of water in the dispersion, and a suspension of a resinous component free of polyoxyethylene segments results only in formation of a sheet product of very poor properties. It is also clear from the results of Comparative Example 4 that even when the dispersion is made under the conditions meeting the requirements of this invention, unless the conditions for the evaporation of methyl ethyl ketone are satisfied, it is impossible to obtain a product having excellent properties such as those of the product obtained according to the process of this invention.

Example 2

A reaction vessel was charged with 750 parts of 4,4'-diphenylmethane diisocyanate maintained at 50° C. and 1710 parts of polyethylene adipate of a molecular weight of 1710 maintained at 60° C., and they were reacted at 80° C. in a nitrogen gas stream for 2 hours to give a viscous prepolymer of a free NCO content of 6.78%. All of the resulting prepolymer was added to a mixture composed of 173 parts of 1,4-butane diol, 3945 parts of methyl ethyl ketone and 3.0 parts of triethylene diamine, and the reaction was effected at 70° C. for 8 hours. The viscosity of the reaction product was 650 poise at 70° C. at completion of the reaction. The product was diluted with methyl ethyl ketone to form a suspension Example 3

Thirty parts of a 7.5% solution of polyvinyl chloride (degree of polymerization being 1000) in methyl ethyl ketone was added to a suspension of the polymer of Example 1 (a solid content being 20%). One hundred and thirty parts of the resulting liquor was mixed under stirring with 65 parts of water to give a white, creamy dispersion of a viscosity at 20° C. of 3400 cps. The resulting dispersion was coated on a non-woven fabric composed of polyethylene terephthalate staple fibers in a thickness in a wet condition of 2.0 mm. The selective evaporation of the methyl ethyl ketone was effected at 30° C. and 40% RH, followed by drying at 100° C. for 20 minutes. The resulting sheet consisting of a lower non-woven fabric layer and an upper microporous coating layer had a soft touch and an excellent vapor permeability. It was excellent also in the abrasion resistance. When the sheet was subjected to a heat treatment at 140° C. for 10 minutes, the abrasion resistance and flexural fatigue resistance of the upper microporous layer were highly improved without damaging the touch and vapor permeability thereof.

Example 4

A reaction vessel was charged with 625 parts of 4,4'-diphenylmethane diisocyanate maintained at 50° C., 1272 parts of polytetramethylene ether glycol of a molecular weight of 1496 maintained at 60° C., and 226 parts of polyoxyethylene glycol of a molecular weight of 1506 maintained at 60° C. Reaction was effected at 95° C. for 2 hours in a nitrogen gas stream to give a viscous prepolymer. All of the prepolymer was added to a solution consisting of 130 parts of 1,4-butane diol, 3187 parts of methyl acetate, 1.0 part of triethylene diamine and 0.1 part of dibutyltin dilaurate, and they were reacted at 55° C. for 12 hours. The reaction product had a viscosity at 55° C. of 2500 poise at completion of the reaction. The product was diluted with methyl acetate to form a white, opaque suspension of a solid content of 18.0%. To 500 parts of the suspension was added 150 parts of water and they were mixed while stirring to form a dispersion of a viscosity at 30° C. of 2500 cps. After removal of bubbles from the dispersion, it was coated by means of a doctor knife on a bi-axially stretched polyethylene terephthalate film in a thickness in a wet condition of 1.8 mm. Thereafter, the selective evaporation of the methyl acetate was effected at 15° C. for 40 minutes, followed by drying at 100° C. for 15 minutes. The resulting microporous sheet had numerous fine micropores and a smooth and beautiful appearance. The properties of the product are shown below.

| | |
|---|---|
| Apparent density (g./cm.$^3$) | 0.67 |
| Strength at breakage (kg./mm.$^2$) | 128 |
| Elongation at breakage (percent) | 440 |
| Tear strength (kg./mm.) | 2.42 |
| Velocity of vapor permeability (mg.cm.$^2$/hr.) | 7.0 |
| Durability | 210 |
| Effective pore coefficient | 1470 |

Example 5

A reaction vessel was charged with 1000 parts of 4,4-diphenylmethane diisocyanate maintained at 50° C., 1168 parts of polybutylene adipate of a molecular weight of 1460 maintained at 60° C., and 350 parts of polyoxyethylene glycol of a molecular weight of 1750 maintained at 60° C. Reaction was effected at 95° C. for 2 hours in a nitrogen gas stream while stirring. All of the reaction product was added to a solution consisting of 224 parts of 1,3-propane diol, 4113 parts of tetrahydrofuran, and 0.3 part of dibutyltin dilaurate, and they were reacted at 60° C. According to advance of the reaction tetrahydrofuran was gradually added to the reaction mixture so as to give a reaction product of a solid content of 30% at the end of the reaction. The viscosity of the product was 260 poise at 60° C. at completion of the reaction and it took a semitransparent appearance. To 1000 parts of the so-obtained solution were added 490 parts of tetrahydrofuran and 510 parts of methyl isobutyl ketone to form a solution of a solid content of 15%.

Five hundred parts of water was added to 1000 parts of the above solution while stirring by means of a high speed mixer. Thus, there was obtained a very stable dispersion having a white, creamy appearance. The dispersion was coated by means of a doctor knife on a bi-axially stretched polyethylene terephthalate film in a thickness in a wet condition of 2.0 mm. The selective evaporation of the tetrahydrofuran at 18° C. for 30 minutes and then at 50° C. and 60% RH for 20 minutes to gel the coating layer. Water and the remaining solvent were removed from the gelled coating layer by drying at 100° C. The sheet formed on the polyethylene terephthalate film was microporous and had an excellent combination of high strength and vapor permeability. The properties of the so-obtained sheet are as follows.

| | |
|---|---|
| Apparent density (g./cm.$^3$) | 0.70 |
| Strength at breakage (kg./mm.$^2$) | 1.40 |
| Elongation at breakage (percent) | 415 |
| Tear strength (kg./mm.) | 3.21 |
| Velocity of vapor permeability (mg./cm.$^2$/hr.) | 6.5 |
| Durability | 273 |
| Effective pore coefficient | 1175 |

Example 6

An impregnation dispersion was prepared by adding 100 parts of tetrahydrofuran to 1000 parts of the dispersion prepared in Example 5. The resulting dispersion was impregnated into a non-woven fabric of a weight of 480 g./m.$^2$ and a thickness of 1.50 mm. prepared by subjecting polyethylene terephthalate staple fibers having a fineness of 1.5 denier and a cut length of 50 mm. to webbing, needling and shrinking treatments. The non-woven fabric was allowed to pass through a rotary roll having a clearance corresponding to 90% of the thickness of the fabric to remove the superfluous dispersion applied to the fabric. Thereafter, the so impregnated substrate was maintained at 30° C. for 20 minutes to effect the selective evaporation of the solvent, followed by drying at 80° C. for 14 minutes. The resulting sheet had a velocity of vapor permeability of 8.0 mg./cm.$^2$/hr. and exhibited a soft touch. When the surface of the sheet was buffed by sand paper, there was obtained a leather substitute of a Veronese tone. When microporous sheets obtained in Examples 1 to 5 were applied to the surface of the so formed sheet, there were obtained sheet-like materials useful as shoe-uppers having a smooth appearance and a high vapor permeability.

Example 7

The dispersion obtained in Example 5 was coated on the dispersion impregnated substrate obtained in Example 6 in a thickness in a wet condition of 2.6 mm., and the selective evaporation of tetrahydrofuran was effected at 25° C. for 30 minutes and then at 50° C. and 80% RH for 30 minutes to gel the coating layer. The remaining solvent and water were removed from the gelled coating layer by drying at 100° C. The resulting sheet consisting of an upper microporous layer and a lower non-woven fabric layer reinforced by the microporous resin had a velocity of vapor permeability of 6.4 mg./cm.$^2$/hr. and was excellent as a leather substitute.

What we claim is:

1. A process for the production of microporous structures which consists essentially of
   (a) preparing a solution or suspension of a resinous component in an organic solvent having a boiling point lower than 120° C., the solubility at 25° C. of water in said organic solvent being less than 50 g. per 100 g. of said solvent, the solid resin content of said solution or suspension being 8–30% by weight, said resinous component comprising more than 70% by weight of a polyurethane elastomer consisting of,
      (A) 100 to 10% by weight of a polyurethane elastomer which is the reaction product of
         (i) a water-insoluble long chain diol selected from the group consisting of polyesters and polyethers having a molecular weight of 500 to 4000 and being substantially hydroxyl-terminated, (ii) an organic diisocyanate, (iii) a bifunctional active hydrogen compound having a molecular weight of 62 to 250, and (iv) a polyoxyethylene compound of a molecular weight of 500 to 4000 containing 1 to 2 active hydrogen atoms at the terminal radicals, said polyurethane elastomer containing, as hydrophilic segments, only polyoxyethylene segments in an amount of 2 to 25% by weight, and
      (B) 0 to 90% by weight of a polyurethane elastomer which is the reaction product of said compounds (i), (ii) and (iii);
   (b) mixing the resulting organic solvent solution or suspension with water in an amount ranging from 50 to 600% by weight based on the weight of said resinous component and exceeding said solubility of water in the organic solvent, to prepare a dispersion;
   (c) coating or impregnating a substrate with the resulting dispersion;
   (d) selectively evaporating said organic solvent from the coated or impregnated substrate at a temperature not higher than 80° C. and at least 10° C. lower than the boiling point of the lowest boiling constituent of said organic solvent, to thereby gel said resinous component; and (e) drying the product of step (d).

2. The process of claim 1 wherein the dried product of step (d) is heat-treated at 130 to 160° C. for 5 to 20 minutes.

3. The process of claim 1 wherein the substrate is woven fabric, non-woven fabric or impregnated non-woven fabric.

4. The process of claim 1 wherein the bifunctional active hydrogen compound (iii) is an aliphatic glycol of 2 to 10 carbon atoms.

5. The process of claim 1 wherein the molar ratio of the bifunctional active hydrogen compound (iii) to the compound (i) or the compounds (i) and (iv) in both (A) and (B) is in the range of from 1:1 to 4:1.

6. The process of claim 1 wherein the organic solvent is selected from the group consisting of methyl ethyl ketone, methyl acetate, tetrahydrofuran/methyl isobutyl ketone mixtures with a weight ratio of 75/25–60/40, tetrahydrofuran/toluene mixtures with a weight ratio of 90/10–80/20 and tetrahydrofuran/ethyl acetate mixtures with a weight ratio of 70/30–60/40.

7. The process of claim 1 wherein the selective evaporation of the organic solvent is effected at a rate of less than 100 g./m.$^2$/min.

8. A process for the production of microporous structures which consists essentially of (a) preparing a solution or suspension of a resinous component in an organic solvent having a boiling point lower than 120° C., the solubility at 25° C. of water in said organic solvent being within the range of 1 to 25 g. per 100 g. of said solvent, the solid resin content of said solution or suspension being 8–30% by weight, said resinous component comprising more than 70% by weight of a polyurethane elastomer consisting of, (A) 100 to 15% by weight of a polyurethane elastomer which is the reaction product of (i) a water-insoluble long chain diol selected from the group consisting of polyesters and polyethers having a molecular weight of 500 to 4000 and being substantially hydroxyl-terminated, (ii) an organic diisocyanate, (iii) a bifunctional active hydrogen compound having a molecular weight of 62 to 250, and (iv) a polyoxyethylene compound of a molecular weight of 500 to 4000 containing 1 to 2 active hydrogen atoms at the terminal radicals, said polyurethane elastomer containing, as hydrophilic segments, only polyoxyethylene segments in an amount of 2 to 25% by weight, and (B) 0 to 85% by weight of a polyurethane elastomer which is the reaction product of said compounds (i), (ii) and (iii);

(b) mixing the resulting organic solvent solution or suspension with water in an amount ranging from 150 to 400% by weight based on the weight of said resinous component and exceeding said solubility of water in the organic solvent, to prepare a dispersion;

(c) coating or impregnating a substrate with the resulting dispersion;

(d) selectively evaporating said organic solvent from the coated or impregnated substrate at a temperature not higher than 80° C. and at least 10° C. lower than the boiling point of the lowest boiling constituent of said organic solvent, to thereby gel said resinous component; and (e) drying the product of step (d).

References Cited

UNITED STATES PATENTS

| | | | |
|---|---|---|---|
| 3,486,946 | 12/1969 | Duddy | 260—2.5 M |
| 3,100,721 | 8/1963 | Holden | 117—135.5 |
| 3,493,634 | 2/1970 | Kolycheck | 260—858 |
| 3,408,315 | 10/1968 | Paine | 260—2.5 M |
| 3,442,842 | 5/1969 | Von Bonin | 260—858 |

WILLIAM D. MARTIN, Primary Examiner

D. COHEN, Assistant Examiner

U.S. Cl. X.R.

117—161 KP, 138 F, 140 A; 260—2.5 AY, 858